United States Patent
Gouch

(10) Patent No.: US 7,485,834 B2
(45) Date of Patent: Feb. 3, 2009

(54) METHOD AND APPARATUS FOR ESTIMATING AN IN-FOCUS POSITION

(75) Inventor: Martin Philip Gouch, Hertfordshire (GB)

(73) Assignee: FFEI Limited, Hertfordshire (GB)

( * ) Notice: Subject to any disclaimer, the term of this patent is extended or adjusted under 35 U.S.C. 154(b) by 99 days.

(21) Appl. No.: 11/350,740

(22) Filed: Feb. 10, 2006

(65) Prior Publication Data

US 2006/0238847 A1  Oct. 26, 2006

(30) Foreign Application Priority Data

Feb. 14, 2005 (GB) .................................. 0503032.5

(51) Int. Cl.
G02B 7/28 (2006.01)
H04N 7/18 (2006.01)
(52) U.S. Cl. .................... 250/201.2; 250/201.4; 348/94
(58) Field of Classification Search ................. 359/202; 250/201, 214 A, 201.3, 201.4, 201.6; 348/79, 348/92, 94, 95, 345, 349, 353
See application file for complete search history.

(56) References Cited

U.S. PATENT DOCUMENTS

| | | | |
|---|---|---|---|
| 5,248,876 A | | 9/1993 | Kerstens et al. |
| 5,394,205 A | | 2/1995 | Ochiai et al. |
| 5,446,276 A | | 8/1995 | Iyoda et al. |
| 5,763,871 A | * | 6/1998 | Ortyn ....................... 250/201.3 |
| 5,912,699 A | * | 6/1999 | Hayenga ..................... 348/132 |
| 7,015,418 B2 | * | 3/2006 | Cahill ..................... 219/121.69 |
| 2004/0256538 A1 | | 12/2004 | Olson et al. |
| 2005/0286800 A1 | | 12/2005 | Gouch |

FOREIGN PATENT DOCUMENTS

| | | |
|---|---|---|
| DE | 20016490 U1 | 12/2000 |
| EP | 1 593 957 A1 | 11/2005 |
| WO | 01/37025 A1 | 5/2001 |

OTHER PUBLICATIONS

"Entering the Age of Fluorescence Imaging in Digital Slide Technology"; Hamamatsu Photonics K.K., Systems Division; Nov. 2006; Japan.

* cited by examiner

Primary Examiner—Thanh X Luu
Assistant Examiner—Tony Ko
(74) Attorney, Agent, or Firm—Sughrue Mion, PLLC

(57) ABSTRACT

A method is provided of estimating an in-focus position of a target in an image scanning apparatus. A first part of the target is scanned at a nominal focus level so as to obtain corresponding image information. One or more further parts of the target are scanned at one or more respective further focus levels so as to obtain corresponding image information. A focus parameter is then calculated for each of the nominal and the one or more further focus levels using the respective image information. An in-focus position common to each of the first and further parts of the target is then estimated using the calculated focus parameters. Corresponding apparatus for performing the method is also provided.

21 Claims, 3 Drawing Sheets

METHOD AND APPARATUS FOR ESTIMATING AN IN-FOCUS POSITION

FIELD OF THE INVENTION

The present invention relates to a method of estimating an in-focus position of a target in an image scanning apparatus, together with apparatus for performing the method.

DESCRIPTION OF THE RELATED ART

There are many situations where image scanning apparatus is used to obtain an image of a target. In many instances the depth of focus provided by the optical arrangement of the apparatus turns out to be less than the variation in the position of the target being scanned. For a substantially opaque target, this can be thought of as the height of the surface varying at different points within the scan by an amount greater than the depth of focus of the apparatus. In order to produce an image of the target the focus needs to be adjusted during the scan.

It is known in the art to use a "focus map" at a number of points within the sample. The focus is measured and the focus between these points is predicted using interpolation techniques. The drawback of this process is that rapid changes in focus require many points to be measured before scanning. This is of course time-consuming and can lower the productivity of the apparatus significantly. Typically there might be eight or nine samples of focus for a single target. If such a target produces an image of say 100,000 pixels by 100,000 lines, there could be as many as 20,000 lines between the focus points. There is therefore a need to improve upon the prior art methods so as to produce a rapid and accurate means of determining the in-focus position at many points within the scan.

SUMMARY OF THE INVENTION

In accordance with a first aspect of the present invention, we provide a method of estimating an in-focus position of a target in an image scanning apparatus, comprising:

scanning a first part of the target at a nominal focus level so as to obtain corresponding image information;

scanning one or more further parts of the target at one or more respective further focus levels so as to obtain corresponding image information;

calculating a focus parameter for each of the nominal and the one or more further focus levels using the respective image information; and, estimating an in-focus position common to each of the first and further parts of the target using the calculated focus parameters.

We have realised that the in-focus position can actually be estimated during the performance of a scan itself. By sacrificing some of the nominally in-focus image information it is possible to estimate the in-focus position by obtaining image information at one or more further focus levels which are dissimilar to the nominal focus level. The information obtained at the further focus level and the nominal focus level can then be used to determine the in-focus position. This is advantageous in that the in-focus position can be estimated at a number of different points during the scan itself. Furthermore there is no need for pre-scanning or any mapping to be performed and therefore the focussing can be performed on-the-fly. Provided sufficiently small amounts of image information are obtained whilst at the further focus level(s), the overall quality of the image information obtained can be maintained by modifying the further focus level image information in accordance with surrounding image information obtained at the nominal focus level.

Preferably two or more further focus levels are used, and these are preferably positioned straddling the nominal focus level. Therefore when two further levels are provided, one is provided on each "side" of the nominal focus level. This is not essential and indeed the separation in focus between the further and nominal levels may be different for each further level. Image scanning is normally performed using a detector array from which scan lines of image information are obtained so as to build up the resultant image. Since focussing is normally a mechanical procedure (at least for the focussing of light), the focus levels are preferably separated from each other by a number of scan lines. This allows time for the apparatus to be adjusted between the various focus levels. The further focus levels may therefore be mutually separated by about 50 scan lines.

Typically the majority of the scan or part of the scan is obtained at the nominal focus level and the focus is modified from the nominal focus to the respective further focus level(s) for a small number of scan lines. In principle, only one scan line may be used for the further focus level although typically three scan lines may be used.

The focus parameter may take a number of forms although preferably it takes the form of a focus merit value. Typically a focus merit value is a numerical measure of the degree of complexity within an image, wherein the greater the value the greater the detail in the image. A more in-focus image has a corresponding higher merit value. It is particularly advantageous in the present invention to use merit values for the further focus levels in the form of normalised merit values. Preferably, the normalisation is performed with respect to the nominal focus level at substantially the same location of the target. The same location of the target is used so as to prevent there being a difference in the amount of image detail present between the merit value at the further focus level and that at the nominal focus level. The assumption is therefore that the level of detail within the target is the same at these adjacent locations such that these can be thought of as substantially the same location.

Once the focus parameters have been obtained for each of the nominal and further focus level(s), the calculation of the estimated in-focus position may be obtained by fitting the focus parameters for the nominal and further focus level(s) to a curve. Such a "curve" also includes a straight line. In addition, the in-focus parameter value at the peak position can also be used to calculate an error in the focus value. Typically the error is inversely proportional to the magnitude of the focus parameter, such as a merit value.

The method may further comprise repeating the method described above at a number of positions across the scan. The estimated in-focus values may then be fitted to a curve so as to estimate the in-focus position between the positions of measurement and/or so as to predict the focus in a region of the target yet to be scanned. For example, if the trend of the focus levels is generally upwards, then it might be expected that the scan is to continue in this manner with an upward direction of focus. This might be the case for example when the target is tilted with respect to the scanning apparatus' optical axis.

It is preferable for the nominal focus level to be as close to the in-focus position as possible. Prior to performing the scan, a starting focus position may be evaluated so as to approximately or accurately determine the in-focus position for the target and the nominal focus level may be set accordingly to correspond to this.

As mentioned earlier, when the image information is obtained at the further focus level(s), the quality of the image information for the focus levels may be improved by modifying said image information by interpolation using adjacent image information obtained at the nominal focus level. In the case where scan lines are used, the interpolation may be performed by using weighted contributions of a number of the nearby scan lines from the adjacent nominal focus level image information.

In accordance with a second aspect of the present invention, we provide image scanning apparatus comprising:

a detector array for obtaining image information from a target;

a scan device for causing relative motion between the detector array and the target;

a focussing device adapted to modify the focus between the detector array and the target; and, a processor adapted to cause the apparatus to perform the method according to the first aspect of the invention by scanning a first part of the target at a nominal focus level so as to obtain corresponding image information, scanning one or more further parts of the target at one or more respective further focus levels so as to obtain corresponding image information, calculating a focus parameter for each of the nominal and the one or more further focus levels using the respective image information, and, estimating an in-focus position common to each of the first and further parts of the target using the calculated focus parameters.

As will be appreciated, the scanning apparatus may typically comprise a scanner, of which various types are envisaged, including scanners which move the target rather than the detector array and any lenses. Suitable means for performing one or each of the scanning, calculating and estimating steps may also be provided.

BRIEF DESCRIPTION OF THE DRAWINGS

An example of a method and apparatus according to the present invention is now described with reference to the accompanying drawings, in which.

DETAILED DESCRIPTION OF SPECIFIC EMBODIMENTS

Figure 1:
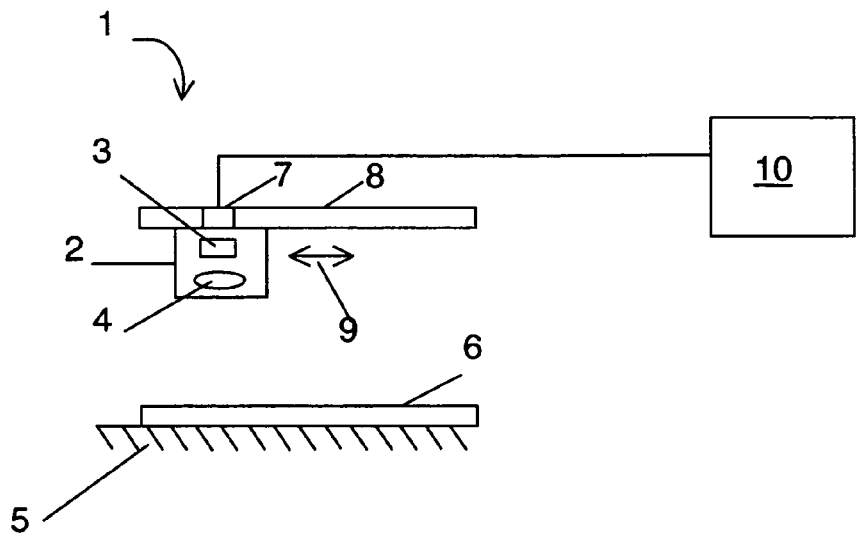
FIG. 1 is a schematic representation of apparatus according to the example.

An example image scanning apparatus is shown generally at 1 in FIG. 1. This comprises a scan head 2 comprising a photo-detector array 3 and an adjustable focus system 4. A platen 5 is provided upon which is positioned a target to be scanned 6. A drive mechanism 7 attaches the scan head to a track 8 such that the scan head can be moved with respect to the target 6 as indicated by the arrows 9. The image scanning apparatus is controlled using a controller 10 which may comprise programmable logic, a dedicated processor or a computer system.

The operation of the image scanning apparatus 1 in performing a method according to the invention will now be described with reference to the flow diagram of FIG. 2. The method begins at step 100 where various setup and initialisation procedures are performed, including positioning the target 6 upon the platen 5. The controller 10 moves the scan head 2 by means of the drive mechanism 7 to a start position. This step may also optionally include an initial focus measurement for example by adjusting the adjustable focus system 4 so as to obtain image information from the target at a number of different focal positions and then determining an in-focus position from focus merit values obtained from the image information at each focal position.

At step 101 the controller operates the adjustable focus system 4 so as to set the focus at a nominal focus level. This may be achieved based upon an earlier focus measurement such as described above, or may be based upon a predetermined focus level or assumed default value.

Figure 3:
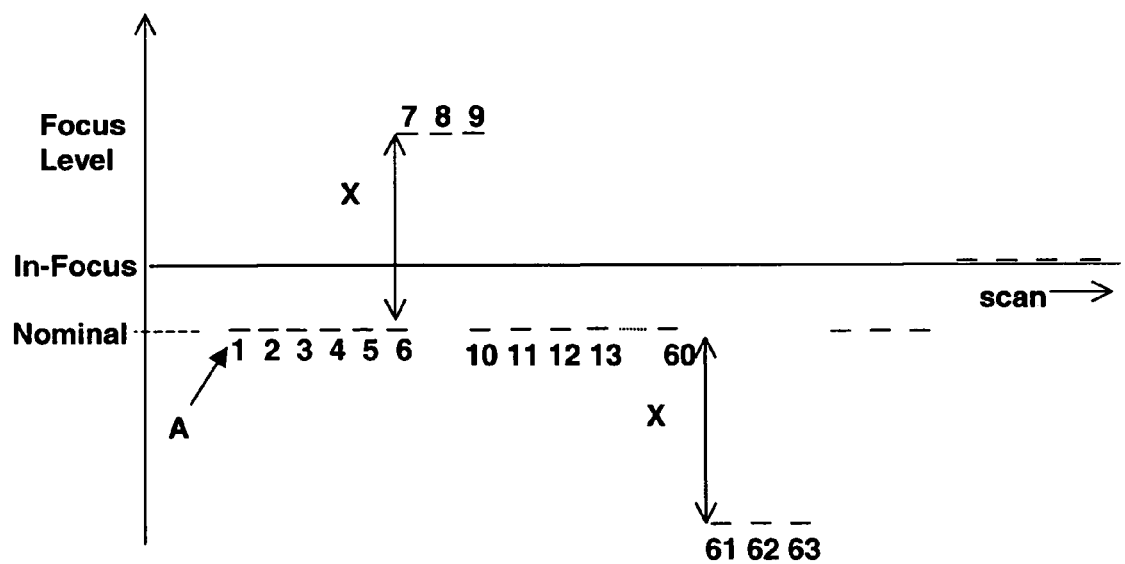
FIG. 3 shows the variation in focus levels.

At step 102, the scan begins with the controller 10 causing the drive mechanism 7 to move the scan head 2 along the track 8 at a predetermined velocity (either smoothly or stop-start). The photo-detector array 3 repeatedly obtains scan lines of image information as the scan proceeds. Referring now to FIG. 3, the focus level at which each of the scan lines is obtained during the scan is illustrated. The ordinate axis is a focus level axis for example representing the vertical direction in FIG. 1 whereas the abscissa axis represents the scan direction (parallel to the arrow 9 in FIG. 1). The scan begins at A in FIG. 3 where a number of scan lines are taken at the nominal focus level. In this case the first six scan lines (numbered 1 to 6 in FIG. 3) are obtained at the nominal focus level. For each of the scan lines, the corresponding image information is recorded. In order to determine whether the nominal focus level is in-focus, at step 103 in FIG. 2 the controller 10 causes the adjustable focus system 4 to adjust the focus level upwards by an amount X (FIG. 3). The subsequent scan lines 7, 8, 9 are obtained at this new first further focus level. It should be noted that the scan can be temporarily slowed between obtaining the scan lines 6 and 7 so as to allow the adjustable focus system time to adjust the focus. However this may not be essential depending on the rapidity with which the scan is performed and with which the focus may be adjusted. Alternatively, scan lines 7 and 9 could be obtained at a "half-focus" position, namely at a distance 0.5X from the nominal focus. These would effectively act as a second further focus position in the present case (see later).

Having obtained the three scan lines 7, 8, 9 at the first further focus level, the controller 10 once again adjusts the focus system 4 to move the focal position back to that of the nominal focus level. Approximately 40 further scan lines are then taken at the nominal focus position, these being illustrated as scan lines 10 to 60 in FIG. 3.

At step 105, the controller 10 causes the adjustable focus system to move the focus in the opposite direction by an amount X and thereafter scan lines 61, 62 and 63 are obtained. As for the first further focus level, once the three scan lines have been obtained at the second further focus level, the focus is returned to the nominal focus level at step 106.

At step 107, the image information obtained at each of the nominal focus, first further focus, and second further focus levels is analysed so as to determine a focus parameter. In the present case, this takes the form of a focus merit value. Such a value provides a numerical value which is dependent upon the amount of fine detail within the image information.

If the target 6 shows no variation in detail across the sample, then the focus merit values calculated at step 107 can be used directly within the later steps described below. However, many samples that are scanned exhibit variations in the complexity of the image as a function of the scan position and therefore preferably a normalisation step is performed at step 108. This is performed only for the first and second further focus levels. The normalisation is performed by taking the focus merit values at scan lines 7, 8 and 9 (for the first further focus level), and dividing these by the value obtained at one or more adjacent scan levels at the nominal focus level, for example 5, 6, 10, 11. Averaging these values may be used to reduce spurious values. The adjacent scan lines for the nominal focus level are used on the assumption that within the five or seven scan lines which are spanned in total, there is very little change in the detail within the target. It is not necessary to normalise the nominal focus level merit value since this is assumed as unity.

Figure 4:
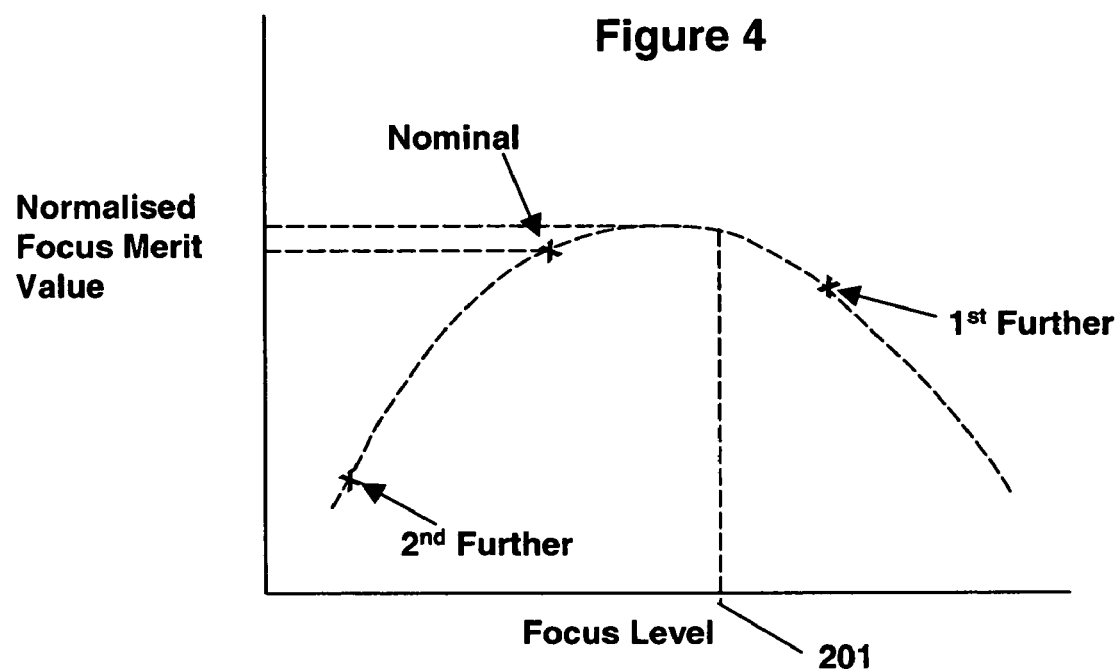
FIG. 4 shows the use of a merit curve to determine the in-focus position.

Referring once more to FIG. 3, it can be seen that the in-focus level is positioned on the first further focus level side of the nominal focus level. Ideally, we wish for the nominal focus level to coincide with the in-focus level and thereby obtain the best image information. In order to determine the position of the in-focus level, the focus merit values for the nominal and first and second further focus levels are fitted to a curve at step 109. An example of such a curve is shown in FIG. 4, this being plotted on a graph of focus parameter (ordinate) in the form of normalised focus merit values, against focus level (abscissa). When a focus merit curve of known general form (illustrated at 200) is fitted to the normalised focus merit values, it becomes clear that the nominal focus position is the nearest to the peak (representing the in-focus position). The intersection of the peak position on the abscissa axis gives the focus level of the in-focus position. The in-focus position is therefore estimated by calculation using this method at step 110.

In addition to determining the in-focus position, it is possible to estimate the error in this position by considering the magnitude of the focus merit value. A large focus merit value indicates a small error. This is because when the image information contains a lot of high frequency content then it gives a large merit value but when it only has a small amount of high frequency content then it gives a low merit value. Such a low merit value is similar to an area of image with lots of high frequency content which is out of focus and as such has had the high frequency content removed. Therefore if a high merit value is produced then it is certain that the in-focus level has been achieved. Furthermore, a high merit value ensures that there is little effect from noise and therefore the peak can be found with greater certainty than a low merit value peak. The error can therefore be assigned as having a magnitude which is inversely proportional to the magnitude of the merit value itself.

Having found the in-focus position (level), the nominal focus can therefore be adjusted at step 112 to coincide with this in-focus position. This is shown in FIG. 3.

Whilst three points are shown in FIG. 4 for fitting the curve, it is beneficial to have a larger number of points so as to improve the curve accuracy. Optionally, each of these can be assumed to have an inherent error within them.

Whilst a number of further focus levels may be used to improve the accuracy of locating the in-focus position, it will be recalled that in doing so there is a reduction in the quality of the image information obtained whilst at these other focus levels. There is therefore a trade-off between the amount of scan lines used in determining the in-focus level and the accuracy of the level so determined. One way of improving this is to add two further points to the curve of FIG. 4, these representing a completely out of focus level. This may be achieved for example by assuming that an integer multiple (such as 3) of the amount X (the difference between nominal and first/second further focus positions) provides a fully out of focus image information and therefore the focus parameter may approach zero. These points can therefore be added to the graph to assist in fitting the curve 200.

In the example described above, it is assumed that the target itself shows no variation in surface height and is therefore flat (for imaging the service at least). However, this is not the case for many samples, either because the sample itself has a surface relief, or because the sample itself is generally tilted with respect to the plane of the scan head.

Figure 5:
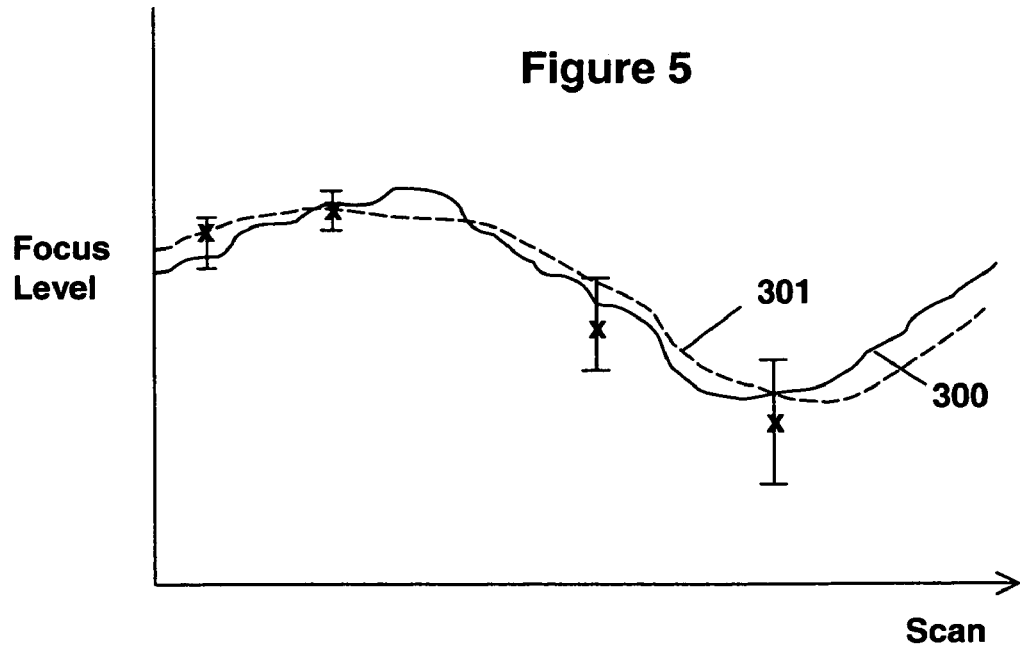
FIG. 5 shows the use of the method to track the surface relief.

As mentioned however, if the in-focus position actually changes as a function of the position across the scan, then the method can be repeated, for example so as to repeatedly estimate the in-focus position at various points across the scan. This is illustrated in FIG. 5 where the actual surface relief is shown at 300 and four in-focus positions are illustrated including their errors. The curve 301 is fitted on-the-fly from the most recent in-focus values and can be used to calculate the in-focus position between various positions of calculation. Furthermore, it can also be used to predict where the next in-focus position will lie, therefore allowing the nominal focus position to be adjusted accordingly prior to performing further first and second further focus level readings at the next location. It can therefore be seen from FIG. 5 that by using periodic estimations of the in-focus position using the method described, the surface topology of the target 6 can be followed during the scan itself. This is extremely advantageous since it requires no pre-scanning and can be performed on-the-fly.

Figure 2:
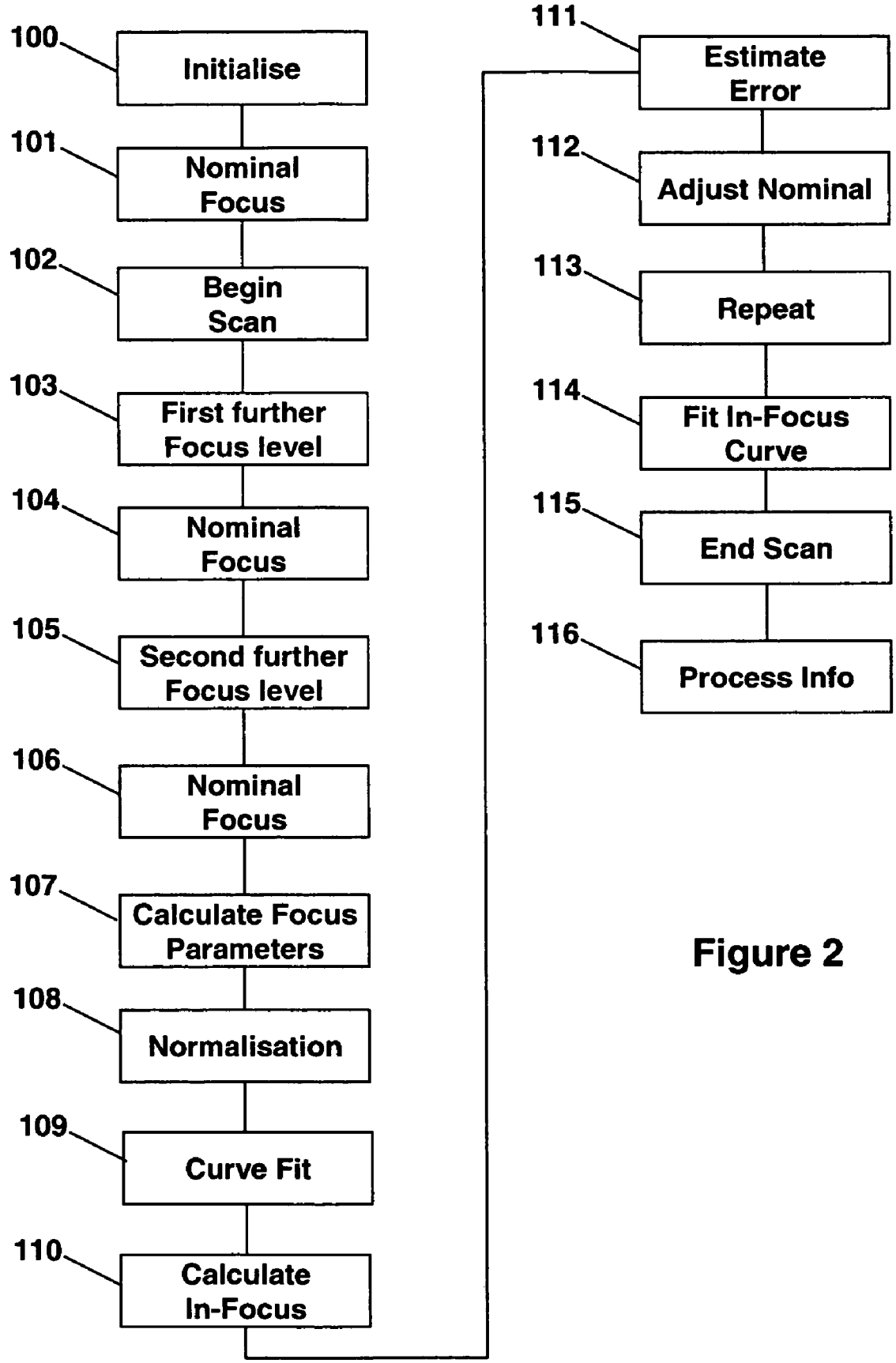
FIG. 2 is a flow diagram of the example method.

The scan ends at step 115 in FIG. 2 and thereafter the data obtained representing the image information are then processed so as to produce the desired image of the target. Alternatively a scan of further swathes can be performed, repeating the method of the earlier steps, prior to processing It will be recalled that the image information obtained at the further focus levels is typically of lower quality than that of the nominal focus level (assuming the in-focus level is nearer to the nominal focus). Since this data is of lower quality, in order to prevent errors within the image, the method further includes a step of processing the information at step 116 so as to improve the image information obtained at these further focus levels. This is achieved by an interpolation method in which the scan lines at the nominal focus levels on either side of each further focus level are used to interpolate the image information. Therefore taking the scan lines 7, 8, 9 as an example, the fractional contributions from nearby lines are shown in the table below.

|  | Fractional Contribution from line 2 | Fractional Contribution from line 6 | Fractional Contribution from line 10 | Fractional Contribution from line 14 |
|---|---|---|---|---|
| Line 7 | −0.0547 | 0.8203 | 0.2734 | −0.0390 |
| Line 8 | −0.06 | 0.56 | 0.56 | −0.06 |
| Line 9 | 0.0390 | 0.2734 | 0.8203 | −0.0547 |

These are the interpolated values at 25%, 50% and 75% of the distance between line 6 and 10 and many other interpolation techniques could be used with other weightings or with non-uniform spacings of the lines for interpolation.

This interpolation significantly improves the quality of the total image. It should be remembered that the scan lines are typically extremely narrow and therefore this interpolation step 116 is not visible in the final image.

It will be appreciated that the present method can be used virtually any scanning system and is not limited to light scanning, for example it could also be used in electron microscopes and the like. The extrapolation of the curve in step 114 could also be improved by the use of focus values in a prescan (where this is performed) or based upon adjacent information from an adjacent "swathe" since many targets are actually scanned in swathes. The focus values for such information may therefore be used as "seed points" for the nominal focus as will be appreciated by one skilled in the art.

What is claimed is:

1. A method of estimating an in-focus level of a target in an image scanning apparatus, the image scanning apparatus configured to obtain one or more scan lines to produce a scan of the target, the method comprising:
    scanning a first part of the target at a nominal focus level so as to obtain a plurality of scan lines comprising corresponding image information;
    scanning one or more further parts of the target at one or more respective further focus levels so as to obtain one or more scan lines at each of the one or more respective further focus levels, the one or more scan lines comprising corresponding image information wherein the number of scan lines obtained at the nominal focus level is greater than the number of scan lines obtained at each of the one or more respective further focus levels;
    calculating a focus parameter for each of the nominal and the one or more further focus levels using the respective scan lines; and,
    estimating an in-focus level common to each of the first and further parts of the target using the calculated focus parameters; and
    adjusting the nominal focus level to coincide with the estimated focus level.

2. A method according to claim 1, wherein at least two further focus levels are used, one on each side of the nominal focus level.

3. A method according to claim 1, wherein, when at least two further focus levels are used, the two groups of one or more scan lines obtained at each of the one or more respective focus levels are spatially separated from each other by a plurality of scan lines obtained at the nominal focus level.

4. A method according to claim 3, wherein the further focus levels are mutually separated by about 50 scan lines.

5. A method according to claim 1, wherein the focus parameter is a focus merit value.

6. A method according to claim 5, wherein the merit value for each of the further focus levels is a normalised merit value, normalised with respect to the nominal focus level at substantially the same location of the target.

7. A method according to claim 1, wherein the calculation of the estimated in-focus level is obtained by fitting the nominal and further focus level focus parameters to a curve.

8. A method according to claim 7, wherein focus parameter values corresponding to substantially out of focus levels, are used to fit the curve, the focus levels for the out of focus values corresponding to a level of 2 or more times the difference between the nominal and further focus levels.

9. A method according to claim 7, wherein the curve has a peak corresponding to the in-focus level.

10. A method according to claim 9, further comprising using the focus parameter value at the peak position to calculate an error in the focus value.

11. A method according to claim 10, wherein the error is inversely proportional to the magnitude of the focus parameter merit value.

12. A method according to claim 1, further comprising repeating the method at a number of positions across the scan and fitting estimated in-focus level parameters to a curve so as to estimate the in-focus level between the positions of measurement and/or so as to predict the focus in a region of the target yet to be scanned.

13. A method according to claim 1, further comprising determining a starting focus level to act as the nominal focus level, prior to performing the scan.

14. A method according to claim 1, further comprising modifying the image information obtained at the further focus levels by interpolation using adjacent image information obtained at the nominal focus level.

15. A method according to claim 14, wherein when the image information for the further focus levels is obtained for a number of scan lines, the interpolation is performed by using weighted contributions of a number of the nearest scan lines from the adjacent nominal focus level image information.

16. A method according to claim 1, wherein the second number of scan lines comprises between one and three scan lines.

17. Image scanning apparatus comprising:
    a detector array for obtaining image information from a target;
    a scan device for causing relative motion between the detector array and the target;
    a focussing device adapted to modify the focus between the detector array and the target; and,
    a processor adapted to cause the apparatus to perform the method according to any of the preceding claims by scanning a first part of the target at a nominal focus level so as to obtain a plurality of scan lines comprising corresponding image information,
    scanning one or more further parts of the target at one or more respective further focus levels so as to obtain one or more scan lines at each of the one or more respective further focus levels, the one or more scan lines comprising corresponding image information wherein the number of scan lines obtained at the nominal focus level is greater than the number of scan lines obtained at each of the one or more respective further focus levels;
    calculating a focus parameter for each of the nominal and the one or more further focus levels using the respective scan lines; and,
    estimating an in-focus level common to each of the first and further parts of the target using the calculated focus parameters; and
    adjusting the nominal focus level to coincide with the estimated focus level.

18. Apparatus according to claim 17 wherein the apparatus comprises a scanner.

19. Apparatus according to claim 17, further comprising means for scanning the target at one or more respective focus levels.

20. Apparatus according to claim 17, further comprising means for calculating a focus parameter.

21. Apparatus according to claim 17, further comprising means for estimating an in-focus level.

* * * * *